United States Patent
Francisco et al.

(10) Patent No.: US 8,910,778 B1
(45) Date of Patent: Dec. 16, 2014

(54) CONVEYOR BELT TRACKING AND CONTINUOUS TAKE-UP TENSIONING

(71) Applicant: KSi Conveyors, Inc., Cissna Park, IL (US)

(72) Inventors: Cesar F Francisco, Cissna Park, IL (US); Steven R Walder, Hoopeston, IL (US)

(73) Assignee: KSi Conveyors, Inc., Sabetha, KS (US)

( * ) Notice: Subject to any disclaimer, the term of this patent is extended or adjusted under 35 U.S.C. 154(b) by 0 days.

(21) Appl. No.: 13/909,117

(22) Filed: Jun. 4, 2013

(51) Int. Cl.
*B65G 23/44* (2006.01)
*B65G 15/64* (2006.01)

(52) U.S. Cl.
CPC ..................... *B65G 15/64* (2013.01)
USPC .................. 198/814; 198/816; 198/837

(58) Field of Classification Search
CPC ................. B65G 23/44; B65G 15/64
USPC ................. 198/813, 814, 816, 837
See application file for complete search history.

(56) References Cited

U.S. PATENT DOCUMENTS

| | | | | |
|---|---|---|---|---|
| 2,808,924 A * | 10/1957 | Wood | | 198/816 |
| 2,939,571 A * | 6/1960 | Robertson | | 198/816 |
| 3,035,685 A * | 5/1962 | Raynor | | 198/842 |
| 3,718,197 A * | 2/1973 | Barten | | 177/16 |
| 3,921,793 A * | 11/1975 | Hutchinson et al. | | 198/813 |
| 4,982,836 A | 1/1991 | Summers | | |
| 5,022,514 A * | 6/1991 | Lofberg | | 198/813 |
| 5,054,608 A * | 10/1991 | Bryant | | 198/816 |
| 6,109,427 A * | 8/2000 | Hosch et al. | | 198/835 |
| 6,170,645 B1 * | 1/2001 | Mitchell | | 198/816 |
| 6,267,228 B1 * | 7/2001 | Cadwell et al. | | 198/806 |
| 6,422,382 B1 * | 7/2002 | Ertel et al. | | 198/860.1 |
| 6,685,009 B1 * | 2/2004 | Hosch et al. | | 198/813 |
| 6,752,261 B1 * | 6/2004 | Gaeddert et al. | | 198/861.1 |
| 6,971,509 B2 | 12/2005 | Ertel | | |
| 6,997,307 B2 * | 2/2006 | Iseli | | 198/813 |
| 7,347,320 B2 * | 3/2008 | Isaman et al. | | 198/835 |
| 7,549,531 B2 * | 6/2009 | Hosch et al. | | 198/493 |

* cited by examiner

*Primary Examiner* — Gene Crawford
*Assistant Examiner* — Keith R Campbell
(74) *Attorney, Agent, or Firm* — Daniel J Coughlin; Bradley Scott Strahm

(57) ABSTRACT

A tracking and tensioning device for a belt conveyor that provides a tracking assembly that is mounted to the conveyor frame. The tracking assembly is capable of sliding along the length of the conveyor frame. An idler roller is mounted to the tracking assembly that is held under constant tension by an adjustable tensioner. The adjustable tensioner provides take-up tensioning at the portion of the belt with the lowest operating tension.

10 Claims, 3 Drawing Sheets

CONVEYOR BELT TRACKING AND CONTINUOUS TAKE-UP TENSIONING

FIELD

This disclosure generally relates to tracking and tensioning of endless belt conveyors.

BACKGROUND

Tracking and take-up tensioning are essential for efficiently driving an endless conveyor belt without excessive wear on the belt. Tracking refers to maintaining proper alignment of the moving belt with the rollers. When the belt is out of alignment, the belt can rub against the sidewall of the conveyor frame. This wear compromises the integrity of the belt, leading to costly and time-consuming maintenance to the conveyor. Tracking in existing conveyors is generally accomplished by adjusting the orientation of the rollers relative to the conveyor frame.

Take-up tensioning refers to maintaining the belt tension necessary to efficiently transfer power from the drive roller to the conveyor belt. Belt tension that is too low causes the drive roller to slip and reduce the energy transferred from the drive roller to the conveyor belt. Belt tension that is too great causes excessive force on the belt, increasing the likelihood that the conveyor belt will break. Tensioning in existing conveyors is generally accomplished by adjusting one or more rollers to stretch the semi-elastic conveyor belt around the end rollers. Alternatively, snub rollers and S-shape roller configurations are used to tension the conveyor belt.

During operation, portions of the conveyor belt are subjected to higher tension because of friction from the drive roller friction and weight from bearing the load of material. Over time, these high-tension areas result in the belt stretching thereby reducing the overall belt tension. Some existing solutions have incorporated a spring to apply tension to the conveyor belt. However, these system generally loop the belt around multiple rollers. Other systems for tensioning and tracking the belt are overly complex resulting in excessive maintenance.

SUMMARY

We recognized that conveyor belt tracking and take-up tensioning could be efficiently accomplished by mounting an idler roller on a sliding tracking assembly that provided belt take-up at the point of minimum belt tension. In order to maintain proper tracking and efficient transfer of energy to drive the belt, we recognized that it is important that the tension in the portion of the belt approaching the drive roller is similar to the tension in the portion of the belt departing the drive roller. The maximum belt tension is location at the portion of the belt approaching the drive roller as the belt is carrying a load toward the discharge end. The portion of the belt departing the drive roller has the smaller tension.

In order to provide tracking and tensioning at the portion of the belt with minimum tension, each end of the idler roller is securely mounted within a tracking slot—a longitudinal aperture in the side of the tracking assembly. The roller end is secured to the tracking assembly with a roller adjustment—an adjustably extendable mount that secures the position of the roller end relative to the tracking assembly. The roller adjustments are used to properly align the roller relative to the conveyor frame. The tracking assembly is mounted on the conveyor frame using a series of slots and guiderails so that the tracking assembly can slide along the length of the conveyor frame. While the tracking assembly is capable of moving longitudinally, the slot and guiderail configuration prevents the tracking assembly from pivoting or from lateral movement.

We also recognized that connecting the conveyor frame and the tracking assembly with an adjustable tensioner could effectively take-up the conveyor belt at the portion of the belt with the lowest tension. The adjustable tensioner adjustably extends and exerts a tensile force to connect the tracking assembly and the conveyor frame. The adjustable tensioner could have an end that is a threaded bolt coupled with a compression spring at the other end. The threaded bolt end is threadably received by an extension off the frame. The compression spring end is attached to an extension off the tracking assembly. Rotating the threaded bolt end causes the adjustable tensioner to extend or retract, and affects the tensile force against the tracking assembly. The tracking assembly remains capable of longitudinal movement relative to the conveyor frame and is constrained by the tensile force of the adjustable tensioner. As the conveyor belt stretches and expands, the compression spring end of the adjustable tensioner continues to exert the tensile force. This retains appropriate tension on the conveyor belt.

It is understood that other embodiments will become readily apparent to those skilled in the art from the following detailed description, wherein various embodiments are shown and described by way of illustration only. As will be realized, the concepts are capable of other and different embodiments and their several details are capable of modification in various other respects, all without departing from the spirit and scope of what is claimed as the invention. Accordingly, the drawings and detailed description are to be regarded as illustrative in nature and not as restrictive.

BRIEF DESCRIPTION OF DRAWINGS

Aspects are illustrated by way of example, and not by way of limitation, in the accompanying drawings, wherein.

DETAILED DESCRIPTION

As noted above, existing conveyors that employ spring adjustment take-up tensioning adjustments either apply the spring tension to a portion of the belt that is already under tension from the drive roller and load or employ independent mechanisms for tracking and tensioning the belt.

Figure 1:
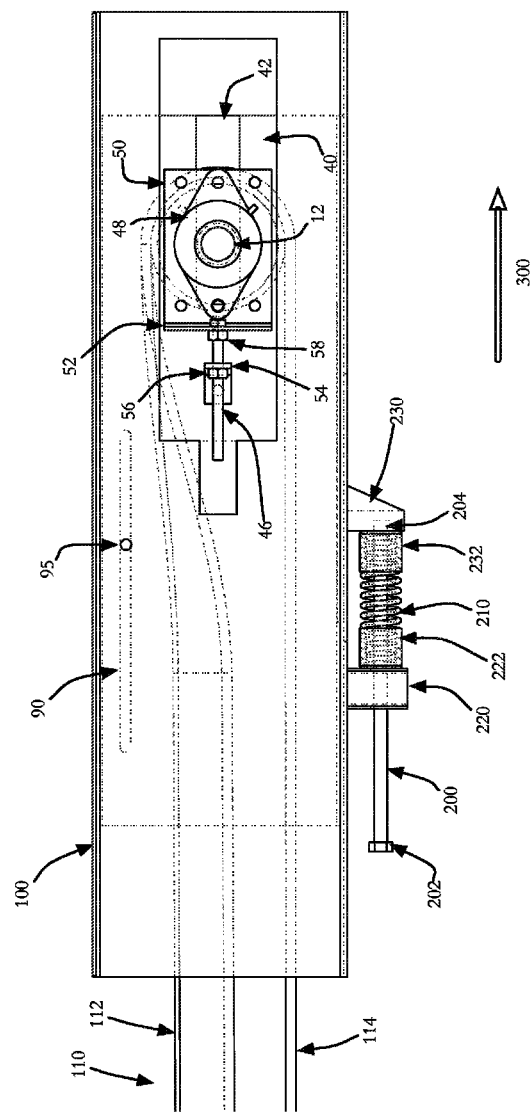
FIG. 1 depicts a side view of the conveyor frame and tracking assembly.

FIG. 1 depicts a tracking and tensioning apparatus that affects the belt tension in the portion of the belt with the lowest operating tension, as described above. As the conveyor operates, a conveyor belt 110 is stretched between two end rollers: a driven roller and an idler roller 10. The drive roller and the idler roller are mounted at the opposite ends of a conveyor frame 100. The idler roller 10 is mounted on a tracking assembly 20 that slides along the inlet end of the conveyor frame 100 on a series of guiderails 95 and sliding slots 90. The adjustable tensioner 200 urges the entire tracking assembly 20—including the idler roller 10—in the direction of arrow 300, thereby applying the tensile force to the conveyor belt 110.

During operation the portion of the belt approaching the drive roller—an approaching belt portion 112—is subject to a greater tension than the portion of the belt that is departing from the drive roller—a departing belt portion 114. Positioning the adjustable tensioner 200 at the idler roller 10 results in take-up of the conveyor belt 110 at the portion of the belt with the lowest operating tension.

Belt take-up is provided at the departing belt portion 114 where belt tension is the lowest by mounting the idler roller 10 to the tracking assembly 20 so that the tracking assembly 20 slides along the length of the conveyor frame 100.

Prior to tensioning the belt, the idler roller must be tracked within the tracking assembly. The idler roller 10 is mounted so that at least one of the ends of the idler roller 10 is adjustably mounted with a roller adjustment 46. The first roller end 12 is received into a ball bearing assembly 48 that allows the idler roller 10 to rotate freely. The second roller end 14 is likewise received into a ball bearing assembly 48.

The roller adjustment 46 provides fine-tuning of the position of the bearing assembly 48 so that the idler roller 10 is properly aligned within the tracking assembly 20. The ball bearing assembly 48 is mounted to the tracking assembly 20 with a ball bearing mount 50. The ball bearing mount 50 has a ball bearing mount adjustment flange 52 that extends perpendicular from the ball bearing mount 50.

The roller adjustment 46 positions a first roller end 12 within a tracking slot 42—a longitudinal aperture in a first sidewall 40 of the tracking assembly 20. A second aperture in a second sidewall 41 of the tracking assembly 20 can receive a second roller end 14. This second aperture can either be configured for adjustment as the tracking slot 42 or can provide a fixed mounting position without the option for tracking adjustment.

Figure 2:
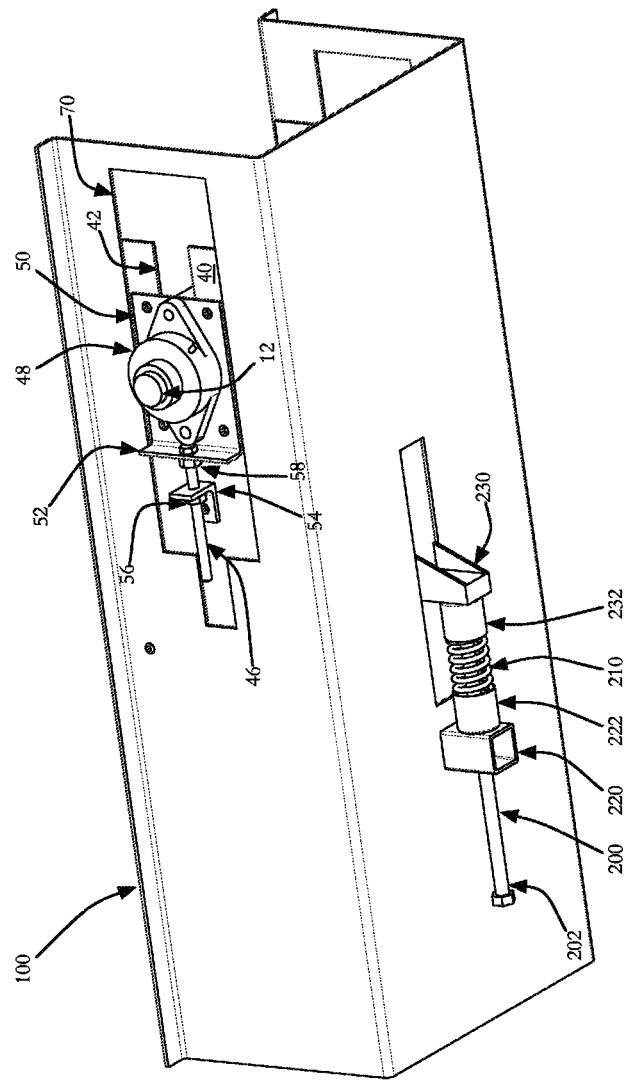
FIG. 2 illustrates a bottom perspective of the conveyor frame and the adjustable tensioner.

FIG. 2 illustrates how the position of the idler roller 10 is securely mounted to the tracking assembly 20 with a roller adjustment 46. The roller adjustment 46 is an adjustably extendable bolt that secures the position of the first roller end 12 relative to the tracking assembly 20. The roller adjustments are used to properly align the idler roller 10 relative to the conveyor frame 100. As the roller adjustment 46 is rotated, the roller adjustment 46 extends or retracts thereby affecting the alignment of the idler roller 10 within the tracking assembly 20. As the roller adjustment 46 extends, the roller adjustment 46 urges the ball bearing mount adjustment flange 52 in the direction of arrow 300 by pressing against a tracking assembly roller adjustment extension 54 that protrudes from the first sidewall 40 of the tracking assembly 20.

Figure 3:
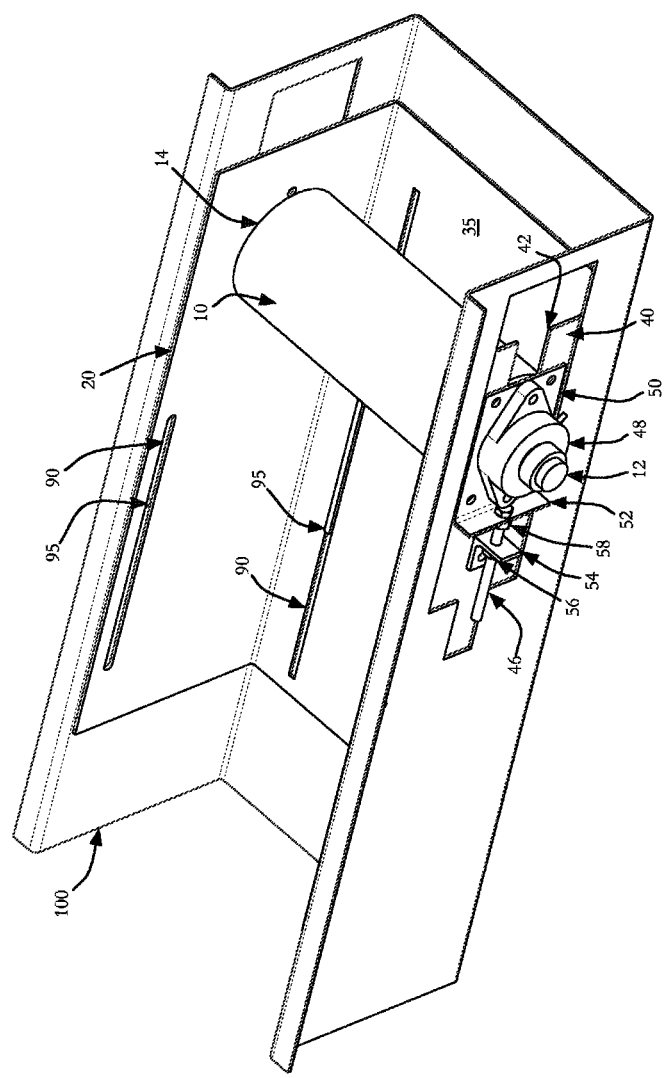
FIG. 3 depicts a top perspective view of the conveyor frame and tracking assembly.

FIG. 3 illustrates the take-up tensioning mechanism that applies the constant tensile force to the idler roller 10. The idler roller 10 is securely mounted to the tracking assembly 20. An adjustable tensioner 200 maintains a constant tensile force between the conveyor frame 100 that is static and the tracking assembly 20 that can freely slide along the length of the conveyor frame 100.

The tracking assembly 20 is mounted on the conveyor frame 100 with a series of sliding slots 90 that are received by a series of guiderails 95 that correspond with the sliding slots 90. The sliding slots 90 and guiderails 95 allow the tracking assembly can slide along the length of the conveyor frame. The guiderails 95 extend from the surface of the conveyor frame 100 and be received by sliding slots 90 disposed in the tracking assembly 20, as illustrated. The guiderails 95 can also extend from the tracking assembly 20 and be received by sliding slots 90 in the conveyor frame 100. The guiderails 95 may be elongated, as shown protruding through the base 35 of the tracking assembly 20. However, the guiderails 95 may also be bolt-like protrusions, as shown protruding through the sidewall 40 of the tracking assembly 20. It is important that the tracking assembly is capable of moving longitudinally, the configuration of the sliding slots 90 and guiderails 95 prevent the tracking assembly from pivoting or lateral movement.

The adjustable tensioner 200 urges the tracking assembly 20 in the direction of arrow 300, thereby applying a tensile force to the conveyor belt 110. The adjustable tensioner 200 adjustably extends and retracts relative to the conveyor frame 100. The adjustable tensioner 200 has a first tensioner end 202 that is threaded and a second tensioner end 204 that is capable of exerting a tensile force. The threaded portion is threadably received by a frame extension. Rotating the adjustable tensioner 200 causes the adjustable tensioner 200 to extend or retract. Alternatively, the position of the adjustable tensioner 200 can be adjusted with a captive sliding nut. The sliding nut would be received within the frame extension 220 and allow the adjustable tensioner 200 to extend and retract.

The second tensioner end 204 is capable of exerting a tensile force between the conveyor frame and the tracking assembly. FIGS. 1 and 2 illustrate a second tensioner end 204 with a compression spring 210 responsible for exerting the tensile force. The compression spring 210 urges the tracking assembly in the direction of arrow 300, thereby applying a tensile force to the conveyor belt 110. It is also possible that the tensile force would be generated using pneumatic or hydraulic actuators.

The position of the adjustable tensioner 200 is first set by extending or retracting the adjustable tensioner 200. This causes the tracking assembly 20 and the idler roller 12 to be positioned relative to the length of the conveyor frame 100, thereby exerting the proper tension on the conveyor belt 110. At the initial tensioning, the compression spring 210 is compressed. As the conveyor belt 110 stretches and expands, the compression spring 210 is capable of expanding, thereby applying a constant tensile force to the conveyor belt 110. This retains appropriate tension on the conveyor belt 110 under varying load conditions, acceleration, deceleration, and as the belt stretches over time.

Each side of the conveyor frame 100 has an assembly slide aperture 70—an elongated aperture—that is configured to allow the ball bearing assembly 48 and roller adjustment 46 to protrude through the side of the conveyor. The assembly slide aperture 70 allows access to the tracking mechanisms.

The adjustable tensioner is illustrated as being an adjustment bolt that is threadably received by a sliding nut. The nut is securely positioned relative to the conveyor frame by a frame extension. As the adjustable tensioner is turned, the adjustment bolt extends or retracts through the sliding nut. The adjustment bolt is connected to a first end of a compression spring. The second end of the compression spring presses against an extension of the tracking assembly. As the adjustment bolt is extended, a greater tensile force is exerted by the compression spring against the tracking assembly. It is also possible that the orientation of the adjustable tensioner is reversed, such that the sliding nut is held in place by the tracking assembly extension and the second end of the compression spring exerts the tensile force against the conveyor frame.

The tracking assembly 20 is illustrated as being received within the conveyor frame 100. It is also possible that the tracking assembly 20 is mounted about the exterior of the conveyor frame 100. The guiderails 95 would extend outwardly from the conveyor frame 100 and be received by the sliding slots of the tracking assembly 20. Mounting the tracking assembly to the outside of the conveyor frame minimizes the risk of accumulating debris and thereby restricting movement of the tracking assembly.

It is understood that other embodiments will become readily apparent to those skilled in the art from the following detailed description, wherein various embodiments are shown and described by way of illustration only. As will be realized, the concepts are capable of other and different embodiments and their several details are capable of modification in various other respects, all without departing from the spirit and scope of what is claimed as the invention. Accordingly, the drawings and detailed description are to be regarded as illustrative in nature and not as restrictive.

What is claimed is:

1. A device for tracking and tensioning a conveyor belt comprising:
   a. an idler roller with a first roller end and a second roller end;
   b. a tracking assembly with a base that connects a first sidewall and a second sidewall;
      i. the first sidewall of the tracking assembly has:
         1. an aperture in the first sidewall that is longitudinal and defines a first tracking slot and receives the first roller end;
         2. a first roller adjustment that is adjustably extendable and secures the position of the first roller end relative to the tracking assembly;
      ii. the second sidewall of the tracking assembly has an aperture in the second sidewall for receiving the first roller end;
      iii. the base of the tracking assembly has a plurality of sliding slots disposed longitudinally;
   c. a conveyor frame has a plurality of guiderails that correspond with and are received by the sliding slots thereby allowing longitudinal movement of the tracking assembly relative to the conveyor frame;
   d. an adjustable tensioner is adjustably extendable and exerts a tensile force to connect the tracking assembly and the conveyor frame whereby the tracking assembly is capable of longitudinal sliding movement relative to the conveyor frame and the movement is constrained by the tensile force exerted by the adjustable tensioner.

2. The device of claim 1 wherein the conveyor frame has a inlet end and a discharge end; the idler roller is an end roller located at the inlet end; and a driven roller is an end roller located at the discharge end.

3. The device of claim 1 wherein the tracking assembly is slidingly mounted to the exterior of the conveyor frame.

4. The device of claim 1 wherein the adjustable tensioner has a first tensioner end that is adjustably extendable and a second tensioner end coupled to a compression spring for exerting the tensile force.

5. A device for tracking and tensioning a conveyor belt comprising:
   a. a conveyor frame;
   b. an idler roller that has a first roller end and a second roller end;
   c. a tracking assembly that receives the first roller end and the second roller end and further comprises;
      i. a tracking slot that receives the first roller end;
      ii. a roller adjustment that secures the position of the first roller end relative to the tracking assembly and is capable of extending or retracting and thereby affecting the alignment of the idler roller within the tracking assembly whereby the idler roller is aligned relative to the tracking assembly;
   d. the tracking assembly is slidably connected to the conveyor frame with a plurality of slots and guiderails whereby the tracking assembly is capable of longitudinal movement relative to the conveyor frame;
   e. an adjustable tensioner is adjustably extendable and exerts a tensile force from the conveyor frame onto the tracking assembly whereby the tensile force of the adjustable tensioner on the tracking assembly maintains constant tension on a conveyor belt during operation.

6. The device of claim 5 wherein the adjustable tensioner has a first tensioner end that is adjustably extendable and a second tensioner end coupled to a compression spring for exerting the tensile force.

7. The device of claim 5 wherein the conveyor frame has a inlet end and a discharge end; the idler roller is an end roller located at the inlet end; and a driven roller is an end roller located at the discharge end.

8. The device of claim 7 wherein the tracking assembly is slidingly mounted to the exterior of the conveyor frame.

9. A device for tracking and tensioning a conveyor belt comprising:
   a. a conveyor frame with an inlet end and a discharge end;
   b. a driven roller mounted to the discharge end of the conveyor frame;
   c. a tracking assembly mounted to the inlet end of the conveyor frame with a plurality of guiderails received into a plurality of sliding slots thereby allowing the tracking assembly to slide along a portion of the length of the conveyor frame;
   d. an idler roller that is adjustably mounted to the tracking assembly with at least a first roller end mounted to a roller adjustment that is adjustably extendable such that the first roller end of the idler roller can be aligned relative to the tracking assembly;
   e. an adjustable tensioner that is attached to the conveyor frame and the tracking assembly; the adjustable tensioner is extendable to control the position of the tracking assembly relative to the conveyor frame; and the adjustable tensioner exerts a constant tensile force as the conveyor belt loses tension during operation of the conveyor.

10. The device of claim 9 wherein the adjustable tensioner has a first tensioner end that is adjustably extendable and a second tensioner end coupled to a compression spring for exerting the tensile force.

* * * * *